United States Patent
Oshitani et al.

(10) Patent No.: US 7,340,908 B2
(45) Date of Patent: Mar. 11, 2008

(54) REFRIGERANT CYCLE DEVICE FOR VEHICLE

(75) Inventors: Hiroshi Oshitani, Toyota (JP); Katsuya Kusano, Obu (JP); Hirokazu Imai, Nagoya (JP); Hirotsugu Takeuchi, Nagoya (JP); Mika Saito, Kariya (JP)

(73) Assignee: DENSO Corporation, Kariya (JP)

( * ) Notice: Subject to any disclaimer, the term of this patent is extended or adjusted under 35 U.S.C. 154(b) by 271 days.

(21) Appl. No.: 11/284,179

(22) Filed: Nov. 21, 2005

(65) Prior Publication Data
US 2006/0107672 A1    May 25, 2006

(30) Foreign Application Priority Data
Nov. 24, 2004    (JP)    ............... 2004-339040

(51) Int. Cl.
F25B 19/02    (2006.01)
F25B 1/06    (2006.01)
(52) U.S. Cl. .......................................... 62/170; 62/500
(58) Field of Classification Search ............... 62/160, 62/170, 191, 278, 175, 500, 324.2, 527
See application file for complete search history.

(56) References Cited
U.S. PATENT DOCUMENTS

| | | |
|---|---|---|
| 6,477,857 B2 | 11/2002 | Takeuchi et al. |
| 6,550,265 B2 * | 4/2003 | Takeuchi et al. ............ 62/324.2 |
| 6,574,987 B2 | 6/2003 | Takeuchi et al. |
| 7,062,929 B2 * | 6/2006 | Nishida et al. ............... 62/170 |
| 2004/0040340 A1 * | 3/2004 | Takeuchi et al. ............. 62/500 |
| 2004/0055327 A1 * | 3/2004 | Ohta et al. ................... 62/500 |
| 2004/0261448 A1 * | 12/2004 | Nishijima et al. ............ 62/500 |
| 2005/0178150 A1 | 8/2005 | Oshitani et al. |

FOREIGN PATENT DOCUMENTS

JP    63-88250 A    *   4/1988

* cited by examiner

Primary Examiner—Mohammad M. Ali
(74) Attorney, Agent, or Firm—Harness, Dickey & Pierce, PLC

(57) ABSTRACT

A vapor-compression refrigerant cycle device includes an ejector, a first evaporator for evaporating refrigerant flowing out of a pressure-increasing portion of the ejector, a second evaporator for evaporating refrigerant to be drawn into a refrigerant suction port of the ejector. In the refrigerant cycle device, a refrigerant suction pipe is connected to a refrigerant outlet of the second evaporator and the refrigerant suction port of the ejector, and the surface of the refrigerant suction pipe is covered by an insulating member. Furthermore, the ejector, the first evaporator, the second evaporator and the refrigerant suction pipe are arranged in a passenger compartment of the vehicle.

20 Claims, 7 Drawing Sheets

REFRIGERANT CYCLE DEVICE FOR VEHICLE

CROSS REFERENCE TO RELATED APPLICATION

This application is based on Japanese Patent Application No. 2004-339040 filed on Nov. 24, 2004, the contents of which are incorporated herein by reference in its entirety.

FIELD OF THE INVENTION

The present invention relates to a refrigerant cycle device and an arrangement structure of the refrigerant cycle device in a vehicle. The refrigerant cycle device includes an ejector having a refrigerant decompressing function and a refrigerant circulating function, and plural evaporators. The refrigerant cycle device can be suitably used for a vehicle air conditioner or/and a vehicle refrigerator, for example.

BACKGROUND OF THE INVENTION

Figure 7:
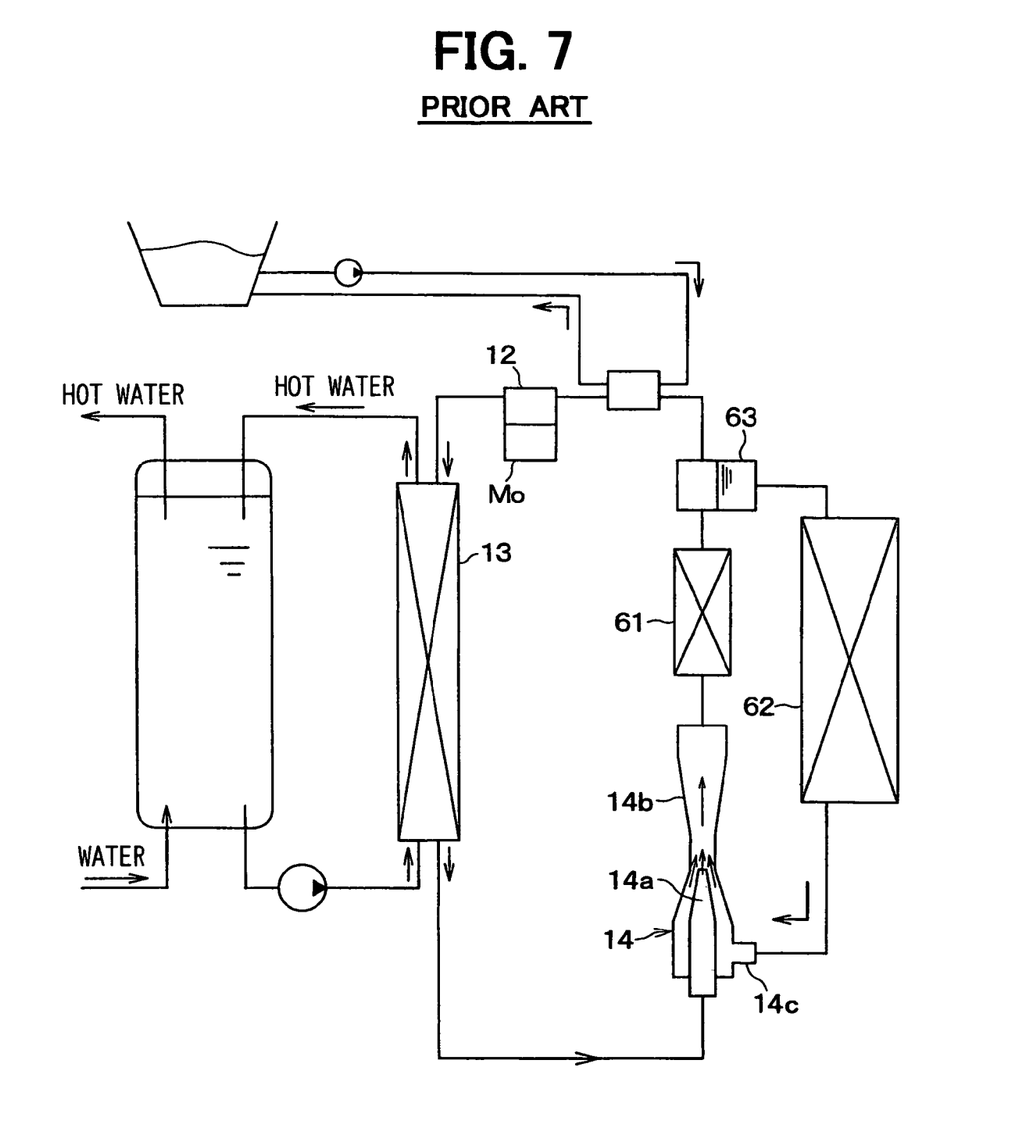
FIG. 7 is a schematic diagram showing a conventional refrigerant cycle device.

In a vapor-compression refrigerant cycle device described in JP-B1-3322263 (corresponding to U.S. Pat. No. 6,477,857 and U.S. Pat. No. 6,574,987), as shown in FIG. 7, an ejector 14 is used as a refrigerant decompressing unit and a refrigerant circulating unit. Further, a first evaporator 61 is located between a refrigerant outlet side of the ejector 14 and a gas-liquid separator 63, and a second evaporator 62 is located between a liquid refrigerant outlet side of a gas-liquid separator 63 and a refrigerant suction port 14c of the ejector 14.

In this refrigerant cycle device, refrigerant discharged from a compressor 12 is cooled in a refrigerant radiator 13 to heat water to be supplied. The refrigerant from the refrigerant radiator 13 is decompressed in a nozzle portion 14a of the ejector 14. In contrast, gas refrigerant discharged from the second evaporator 62 is drawn using a pressure reduction caused by a high-speed refrigerant stream jetted from the nozzle portion 14a. The refrigerant drawn from the refrigerant suction port 14c and the refrigerant jetted from the nozzle portion 14a are mixed in a diffuser 14b, and the pressure of refrigerant is increased by converting the speed energy of the refrigerant to the pressure energy of the refrigerant.

In this refrigerant cycle device, only gas refrigerant is drawn into the compressor 12 from the gas-liquid separator 63, and only liquid refrigerant is introduced into the second evaporator 62. Therefore, the gas-liquid separator 63 is required. Furthermore, by using the single ejector 14, a refrigerant circulation into both the first and second evaporators 61, 62 is performed while a refrigerant circulation of the ejector 14 is performed. Therefore, it is difficult to suitably adjust the flow amount of refrigerant into each of the first and second evaporators 61, 62. Accordingly, cooling performance of the refrigerant cycle device cannot be effectively improved.

Furthermore, if the refrigerant cycle device is simply arranged in a vehicle, a mounting performance of the refrigerant cycle device may be deteriorated, and cooling performance of the refrigerant cycle device may be deteriorated.

SUMMARY OF THE INVENTION

In view of the above-described problems, it is an object of the present invention to provide a refrigerant cycle device for a vehicle, which effectively improves cooling performance.

It is another object of the present invention to improve cooling performance and mounting performance of a refrigerant cycle device having an ejector, in a vehicle.

It is further another object of the present invention to provide an arrangement structure of a refrigerant cycle device in a vehicle.

According to an aspect of the present invention, a refrigerant cycle device for a vehicle includes a compressor which compresses refrigerant; a refrigerant radiator for cooling high-pressure refrigerant discharged from the compressor; an ejector which includes a nozzle for decompressing and expanding refrigerant from the refrigerant radiator, a refrigerant suction port from which refrigerant is drawn by a refrigerant steam jetted from the nozzle, and a pressure-increasing portion in which the refrigerant jetted from the nozzle and the refrigerant drawn from the refrigerant suction port are mixed and pressure of the refrigerant is increased by converting speed energy to pressure energy; a first evaporator located at a downstream side of the ejector and having a refrigerant outlet coupled to a refrigerant suction side of the compressor; a first branch passage through which a refrigerant downstream side of the refrigerant radiator is connected to a refrigerant suction port of the ejector; a first throttle member located in the first branch passage for decompressing refrigerant from the refrigerant radiator; a second evaporator located in the first branch passage at a refrigerant downstream side of the first throttle member; a refrigerant suction pipe between a refrigerant outlet of the second evaporator and the refrigerant suction port of the ejector.

In the refrigerant cycle device, the refrigerant suction pipe is provided to define a part of the first branch passage, and an insulating member is provided on a surface of the refrigerant suction pipe. Furthermore, the ejector, the first evaporator, the second evaporator and the refrigerant suction pipe are arranged in a passenger compartment of the vehicle. Accordingly, the length of the refrigerant suction pipe between the refrigerant outlet of the second evaporator and the refrigerant suction port of the ejector can be made shorter as compared with a case where the ejector and the refrigerant suction pipe are arranged in the engine compartment. Therefore, the pressure loss in the refrigerant suction pipe can be made small, and the refrigerant evaporation pressure of the second evaporator can be reduced thereby improving the cooling performance of the second evaporator. Furthermore, the insulating material prevents dew condensation from being caused on the surface of the refrigerant suction pipe.

In the refrigerant cycle device, the refrigerant outlet of the pressure increasing portion of the ejector can be coupled to the first evaporator so that all refrigerant from the pressure increasing portion of the ejector is introduced to the first evaporator. Alternatively, a second throttle member for decompressing the refrigerant from the refrigerant radiator can be coupled to a refrigerant inlet of the first evaporator. In this case, the refrigerant outlet of the pressure increasing portion of the ejector can be coupled to a portion between the refrigerant outlet of the first throttle member and the refrigerant inlet of the second evaporator.

The insulating member can be provided to cover all surfaces of the refrigerant suction pipe and the ejector. Furthermore, the first evaporator can be disposed to cool air to be blown into the passenger compartment, and the second evaporator can be disposed to cool a refrigerator arranged in the passenger compartment.

In the refrigerant cycle device, there can be provided with a second branch passage that is branched from a refrigerant downstream side of the refrigerant radiator and is connected to a refrigerant outlet side of the first evaporator. Further, a second throttle member can be disposed in the second branch passage for decompressing refrigerant, and a third evaporator can be disposed in the second branch passage at a refrigerant downstream side of the second throttle member. In this case, the first evaporator can be arranged to cool air to be blown toward a front area in the passenger compartment, and the third evaporator can be arranged to cool air to be blown toward a rear area in the passenger compartment.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

Preferred embodiments of the present invention will be described hereinafter with reference to the accompanying drawings.

First Embodiment

Figure 1:
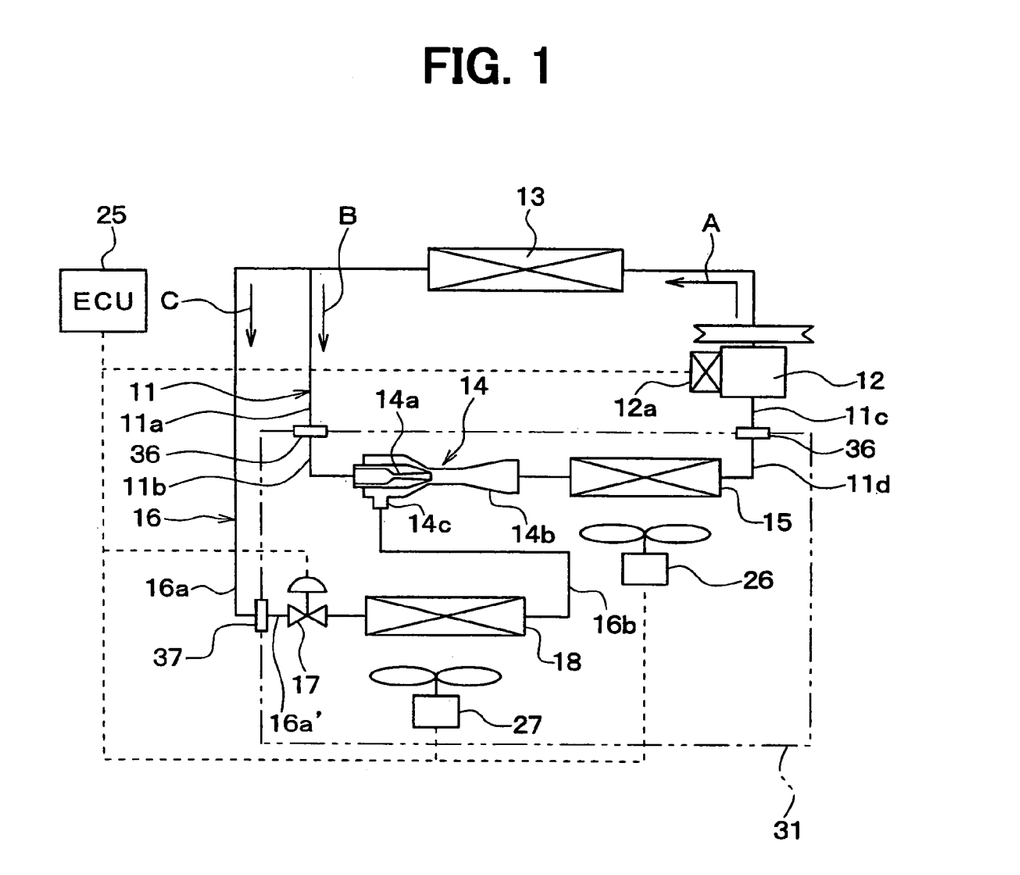
FIG. 1 is a schematic diagram showing a refrigerant cycle device for a vehicle, according to a first embodiment of the present invention.

In the first embodiment, a vapor-compression refrigerant cycle device having an ejector, shown in FIG. 1, is typically used for a vehicle air conditioner, as an example. The refrigerant cycle device includes a refrigerant circulating path 11 in which refrigerant flows in this order of a discharge side of a compressor 12, a refrigerant radiator 13, an ejector 14, a first evaporator 15 and a suction side of the compressor 12.

In this embodiment, the compressor 12 for compressing refrigerant is driven and rotated by a vehicle engine through a belt. The compressor 12 is a variable displacement compressor in which a refrigerant discharge capacity can be adjusted by adjusting its displacement. For example, the displacement is a refrigerant amount discharged from the compressor 12 in per rotation. As the variable displacement compressor 12, a swash-plate type compressor can be used. In this case, a pressure (i.e., control pressure) in a swash chamber is changed by an electromagnetic pressure control unit 12a, so that an angle of a swash plate can be electrically controlled from an exterior.

The refrigerant radiator 13 is arranged at a refrigerant discharge side of the compressor 12. The refrigerant radiator 13 cools high-pressure refrigerant discharged from the compressor 12 by performing a heat exchange between the high-pressure refrigerant and outside air (i.e., air outside a passenger compartment) blown by a cooling fan (now shown).

The ejector 14 is disposed downstream from the refrigerant radiator 13 in a refrigerant flow. The ejector 14 is a decompression unit for decompressing refrigerant, and is a kinetic pump for performing a transporting of a fluid by entrainment of a jet flow of a drive fluid injected at a high speed.

Specifically, the ejector 14 includes a nozzle portion 14a and a diffuser portion 14b. The nozzle portion 14a decompresses and expands refrigerant flowing from the refrigerant radiator 13 substantially in isentropic by reducing a refrigerant passage area. The refrigerant flow speed is increased in the nozzle portion 14a by converting pressure energy of the refrigerant to speed energy of the refrigerant.

The ejector 14 has a refrigerant suction port 14c from which gas refrigerant from a second evaporator 18 is drawn by the high speed refrigerant stream jetted from the nozzle portion 14a.

The diffuser portion 14b is positioned at a downstream refrigerant side of the nozzle portion 14a and the refrigerant suction port 14c. In the diffuser portion 14b, the speed energy of refrigerant (dynamic pressure) is converted to the pressure energy of refrigerant (stationary pressure) by gradually increasing a sectional passage area of the diffuser portion 14b. Accordingly, the refrigerant pressure is increased in the diffuser portion 14b.

The refrigerant flowing out of the diffuser portion 14b flows into the first evaporator 15. For example, the first evaporator 15 is disposed in an air conditioning case of an air conditioning unit, arranged in the passenger compartment, to cool air to be blown into the passenger compartment.

In this case, a first blower 26 (e.g., electrical blower) is disposed in the air conditioning unit so that air to be blown into the passenger compartment is sent to the first evaporator 15. Therefore, low-pressure refrigerant decompressed in the ejector 14 is evaporated in the first evaporator 15 by absorbing heat from air passing through the first evaporator 15, thereby the air to be blown into the passenger compartment is dehumidified and cooled. The gas refrigerant evaporated in the first evaporator 15 is drawn into the compressor 12, and is circulated in the refrigerant circulating path 11.

A branch passage 16 is formed to be branched from the refrigerant circulating path 11 at a branch portion between the refrigerant radiator 13 and the ejector 14. The branch passage 16 is a refrigerant passage from the refrigerant branch portion of the refrigerant circulating path 11 to the refrigerant suction port 14c of the ejector 14.

A throttle mechanism 17 (throttle unit) is provided in the branch passage 16, and the second evaporator 18 is arranged in the branch passage 16 at a downstream refrigerant side of the throttle mechanism 17. For example, the second evaporator 18 is located in a refrigerator mounted on a vehicle, and cools air blown by a second blower 27 (e.g., electrical blower) located in the refrigerator.

The throttle mechanism 17 decompresses high-pressure refrigerant from the refrigerant outlet portion of the refrigerant radiator 13 into gas-liquid two-phase refrigerant having a low temperature and low pressure, and also adjusts a flow amount of refrigerant flowing into the second evaporator 18. For example, the throttle mechanism 17 can be constructed with a combination structure in which an electromagnetic valve and a fixed throttle are combined. In this case, the electromagnetic valve of the throttle mechanism 17 switches the refrigerant flow into the second evaporator 18, and the fixed throttle of the throttle mechanism 17 adjusts a refrigerant flow amount flowing into the second evaporator 18 when the electromagnetic valve is opened.

The branch passage 16 is formed by a pipe member, which includes a high-pressure side refrigerant pipe 16a arranged at an upstream side of the throttle mechanism 17, and a refrigerant suction pipe 16b connected to a refrigerant outlet port of the second evaporator 18 and the refrigerant suction port 14c of the ejector 14.

The electromagnetic pressure control device 12a of the variable displacement compressor 12, the first and second blowers 26, 27, the electromagnetic valve of the throttle mechanism 17 are electrically controlled by control signals from an electronic control unit (ECU) 25.

Figure 2:
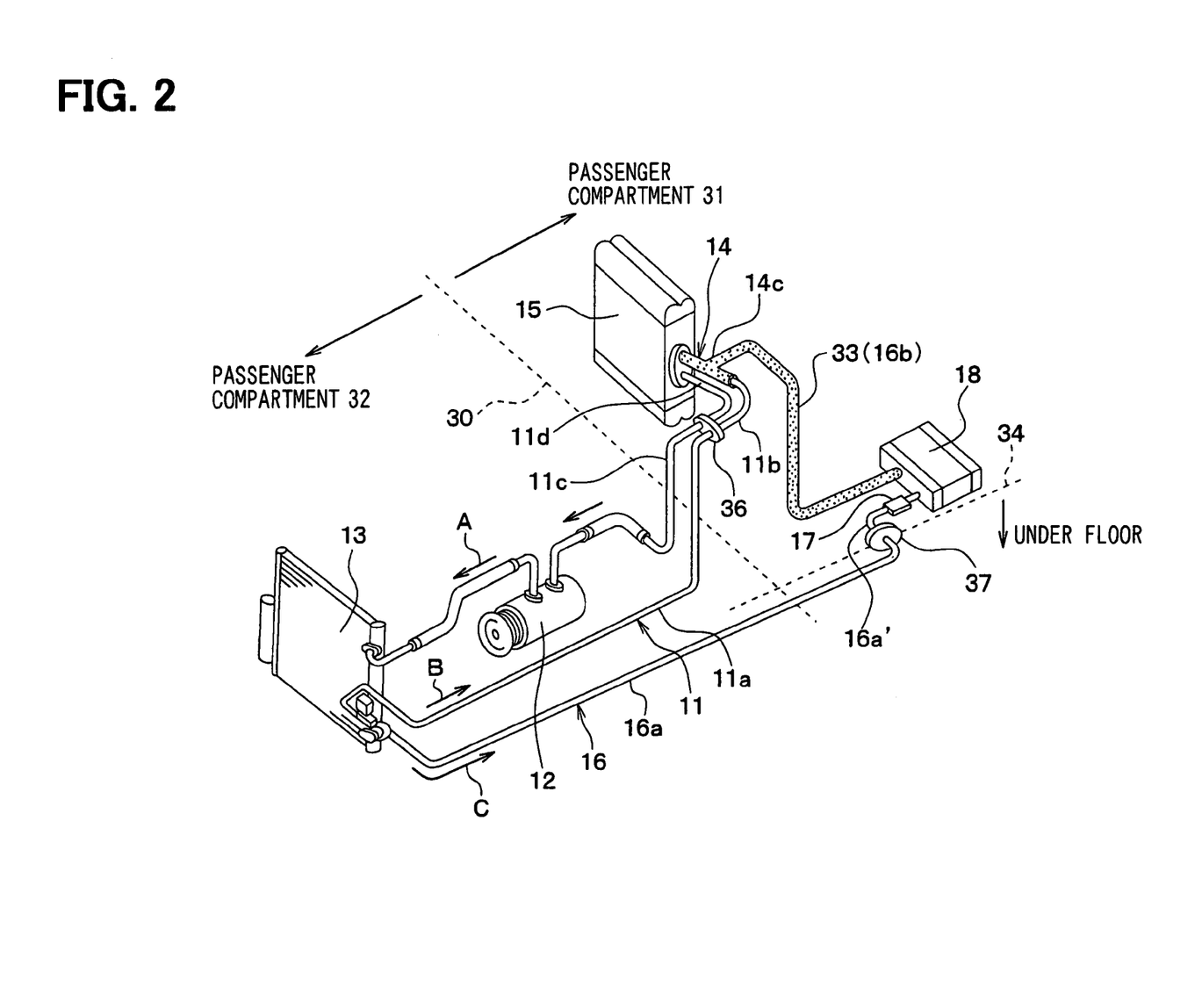
FIG. 2 is a schematic diagram showing a mounting state of the refrigerant cycle device in a vehicle, according to the first embodiment.

FIG. 2 is a schematic diagram showing a mounting state of the refrigerant cycle device in a vehicle. Number 30 indicates a partition plate (dashboard), which partitions a passenger compartment 31 and an engine compartment 32 from each other in the vehicle. Among the components of the refrigerant cycle device, the ejector 14, the first evaporator 15, the throttle mechanism 17, the second evaporator 18 and the first and second blowers 26, 27 are located in the passenger compartment 30. In contrast, the compressor 12 and the refrigerant radiator 13 are located in the engine compartment 32.

The air conditioning unit, in which the first evaporator 15 is contained, is generally arranged inside an instrument panel at a front portion in the passenger compartment 31. In this embodiment, the ejector 14 is arranged integrally with the first evaporator 15. The refrigerator having therein the second evaporator 18 is generally arranged adjacent to a center console of the passenger compartment 31.

Generally, a necessary cooling capacity of the first evaporator 15 is sufficiently large as compared with a necessary cooling capacity of the second evaporator 18. The ejector 14 is arranged in the passenger compartment 31 at a position adjacent to the first evaporator 15 which has the larger cooling capacity.

A pipe connector 36 is arranged in the partition plate 30. The refrigerant circulating path 11 is formed by a refrigerant pipe member, which includes a first high-pressure refrigerant pipe 11a located in the engine compartment 32, a second high-pressure refrigerant pipe 11b located in the passenger compartment 31, a first low-pressure refrigerant pipe 11c located in the engine compartment 32, and a second low-pressure refrigerant pipe 11d located in the passenger compartment 31. The pipe connector 36 is disposed to connect the first high-pressure refrigerant pipe 11a and the second high-pressure refrigerant pipe 11b with each other, and to connect the first low-pressure refrigerant pipe 11c and the second low-pressure refrigerant pipe 11d with each other.

In this embodiment, because both the ejector 14 and the second evaporator 18 are disposed in the passenger compartment 31, all the refrigerant suction pipe 16b arranged at the refrigerant outlet side of the second evaporator 18 is positioned in the passenger compartment 31. Within the refrigerant suction pipe 16b, low-temperature refrigerant from the refrigerant outlet of the second evaporator 18 flows. Accordingly, if a metal outer surface of the refrigerant suction pipe 16b is directly exposed to the passenger compartment 31, dew drops (condensations) are generated on the metal outer surface of the refrigerant suction pipe 16b.

Accordingly, in this embodiment, an insulation material 33 for preventing dew drops from being generated are attached to the metal outer surface of the refrigerant suction pipe 16b over the entire length. Similarly, because the low-temperature refrigerant also flows into the ejector 14, the insulation material 33 for preventing the dew drops from being generated are also attached to the metal outer surface of the ejector 14. The attachment range of the insulation material 33 covering the refrigerant suction pipe 16b and the ejector 14 is indicated in FIG. 2.

For example, a pipe-shaped insulation material 33 can be attached to the metal outer surface of the refrigerant suction pipe 16b. Furthermore, a plate-shaped insulation material 33 can be wound on the metal outer surface of the ejector 14. The insulation material 33 can be made of a resin foam material (porous resin material).

The throttle mechanism 17 and the second evaporator 18 are arranged in the passenger compartment 31 at a position adjacent to a floor plate 34. A pipe connector 37 is arranged in the floor plate 34. The pipe connector 37 connects the high-pressure refrigerant pipe 16a arranged in a space under the floor plate 34 and a high-pressure refrigerant pipe 16a'. The high-pressure refrigerant pipe 16a' is located in the passenger compartment 31 to be positioned at an inlet side of the throttle mechanism 17.

In this embodiment, the pipe connector 36 secured in a through hole formed on the partition plate 30 is provided as a first communicating device, which is provided close to the ejector 14 and the first evaporator 15. A high-pressure refrigerant passage provided by the high-pressure refrigerant pipe 11a, 11b for the first evaporator 15 is led into the passenger compartment 31 through the pipe connector 36. The pipe connector 37 secured in a through hole formed on the floor plate 34 is provided as a second communicating device, which is provided close to the second evaporator 18. A high-pressure refrigerant passage provided by the high-pressure refrigerant pipe 16a, 16a' for the second evaporator 18 is led into the passenger compartment 31 through the pipe connector 37. The pipe connectors 36, 37 are separately located on the vehicle. Therefore, the high pressure pipes 11a, 11b, 16a, and 16a' are mainly arranged on outside the passenger compartment. On the contrary, the refrigerant suction pipe 16b and the ejector 14, which are kept relatively lower temperature, can be arranged in the passenger compartment 31. The pipe connector 36 is also provided as a communicating device for a common low pressure passage, which conduits the refrigerant passed through the first and second evaporators 15 and 18, provided by the low pressure refrigerant pipes 11c and 11d.

The components arranged in the engine compartment 32 may be arranged in a compartment outside the passenger compartment, a power source compartment or simply on an outside the vehicle in an exposed fashion. In the case of a motor driven vehicle or a hybrid vehicle, the compressor 12 may be driven by an electric motor, and those components arranged in the engine compartment 32 may be arranged in a motor compartment or a battery compartment.

The insulation material 33 may cover only a part of inside components (i.e., components inside the passenger compartment) such as the refrigerant suction pipe 16b and the ejector 14. The covered portion with the insulation material 33 is designed to reduce or prevent unexpected heat transfer to the inside components.

The throttle mechanism 17 can be arranged in the space under the floor plate 34. That is, the throttle mechanism 17 can be arranged at the side of the high-pressure refrigerant pipe 16a, relative to the pipe connector 37. The ECU 25 is generally arranged in the passenger compartment 30, but can be arranged outside the passenger compartment 30. For example, the ECU 25 can be arranged in the engine compartment 32.

Next, operation of the vapor-compression refrigerant cycle device will be now described. When the compressor 12 is driven by the vehicle engine, high-pressure high-temperature refrigerant compressed in the compressor 12 is discharged in the arrow A shown in FIGS. 1 and 2, and flows into the refrigerant radiator 13. In this case, when the refrigerator is used, electrical power is supplied to the electromagnetic valve of the throttle mechanism 17 so that the electromagnetic valve of the throttle mechanism 17 is opened.

High-temperature high-pressure refrigerant from the compressor 12 is cooled and condensed in the refrigerant radiator 13 by performing heat exchange with outside air. Refrigerant flowing out of the refrigerant radiator 13 is branched into a refrigerant stream flowing through the refrigerant circulating path 11 in the arrow B shown in FIGS. 1 and 2, and a refrigerant stream flowing through the branch passage 16 in the arrow C shown in FIGS. 1 and 2.

The refrigerant flowing through the branch passage 16 is decompressed in the throttle mechanism 17 so that a low-pressure refrigerant can be obtained. The low-pressure refrigerant from the throttle mechanism 17 is evaporated by absorbing heat from air blown by the second blower 27. Therefore, cooling function of the refrigerator can be obtained by the second evaporator 18.

The refrigerant amount flowing through the branch passage 16, that is, the refrigerant amount flowing into the second evaporator 18 can be independently adjusted by the fixed throttle of the throttle mechanism 17. For example, as the fixed throttle of the throttle mechanism 17, an orifice or a capillary tube can be used. Accordingly, the cooling capacity of the second evaporator 18 for cooling the space of the refrigerator can be controlled by the refrigerant flow amount which is adjusted by the fixed throttle and the rotational speed (air blowing amount) of the second blower 27. The gas refrigerant flowing out of the second evaporator 18 is drawn into the refrigerant suction port 14c of the ejector 14.

The refrigerant flowing through the refrigerant circulating path 11 from the refrigerant radiator 13 flows into the nozzle portion 14a of the ejector 14, and is decompressed and expanded in the nozzle portion 14a. The nozzle portion 14a decompresses and expands refrigerant flowing from the refrigerant radiator 13 substantially in isentropic by reducing a refrigerant passage area. The refrigerant flow speed is increased in the nozzle portion 14a by converting pressure energy of the refrigerant to speed energy of the refrigerant. That is, the pressure energy of the refrigerant is converted to the speed energy of the refrigerant in the nozzle portion 14a, and high-speed refrigerant is jetted from a jet port of the nozzle portion 14a. At this time, a refrigerant pressure is reduced around the jet port of the nozzle portion 14a due to the high-speed jet flow of refrigerant, so that gas refrigerant evaporated in the second evaporator 18 is drawn from the refrigerant suction port 14c.

The refrigerant jetted from the nozzle portion 14a and the refrigerant drawn from the refrigerant suction port 14c are mixed at a downstream side of the nozzle portion 14a, and flows into the diffuser portion 14b. Because the, passage sectional area is enlarged in the diffuser portion 14b, the speed energy of the refrigerant is converted to the pressure energy in the diffuser portion 14b, so that the pressure of refrigerant is increased in the diffuser portion 14b. The refrigerant flowing out of an outlet port of the diffuser portion 14b flows into the first evaporator 15.

In the first evaporator 15, the refrigerant is evaporated by absorbing heat from air passing through the first evaporator 15 so that air to be blown into the passenger compartment is cooled. The gas refrigerant from the first evaporator 15 is drawn into the compressor 12 and is compressed in the compressor 12 to be circulated in the refrigerant circulating path 11. The cool air cooled in the first evaporator 15 is blown by the first blower 26 toward the passenger compartment.

The displacement of the compressor 12 is controlled by the ECU 25 so that the refrigerant discharge capacity of the compressor 12 is controlled and the refrigerant flow amount flowing into the first evaporator 15 can be controlled. Furthermore, the rotation speed (air blowing amount) of the first blower 26 is controlled by the ECU 25. Accordingly, a cooling operation of the first evaporator 15, for cooling the passenger compartment, can be controlled by controlling the refrigerant discharge capacity of the compressor 12 and the rotation speed of the first blower 26.

In this embodiment, the refrigerant from the diffuser portion 14b of the ejector 14 is supplied to the first evaporator 15, and at the same time, the refrigerant in the branch passage 16 is supplied to the second evaporator 18 through the throttle mechanism 17. Therefore, cooling function can be obtained in both the first and second evaporators 15, 18.

The refrigerant evaporation pressure of the first evaporator 15 corresponds to the pressure after pressure-increased in the diffuser portion 14b. In contrast, because the refrigerant outlet side of the second evaporator 18 is coupled to the refrigerant suction-port 14c of the ejector 14, a reduced pressure immediately after decompressed at the nozzle portion 14a is applied to the second evaporator 18.

Accordingly, the refrigerant evaporation pressure of the second evaporator 18 can be made lower than the refrigerant evaporation pressure of the first evaporator 15. Therefore, the refrigerant evaporation temperature of the second evaporator 18 can be made lower than the refrigerant evaporation temperature of the first evaporator 15. Thus, a cooling function in a relatively low temperature range suitable to the cooling operation in the refrigerator can be obtained by the second evaporator 18, while a cooling function in a relatively high temperature range suitable to the cooling operation of the passenger compartment can be obtained by the first evaporator 15.

Accordingly, by using the simple structure adding the branch passage 16 into the refrigerant circulating path 11, both the high and low cooling functions can be simultaneously obtained.

As described above, in this embodiment, the refrigerant flow amount supplied to the second evaporator 18 can be independently adjusted by the throttle mechanism 17, and the refrigerant flow amount supplied to the first evaporator 15 can be adjusted by controlling the refrigerant discharge capacity of the compressor 12 and the throttle characteristics of the nozzle portion 14a of the ejector 14. Therefore, the refrigerant amount flowing into the first and second evaporators 15, 18 can be easily adjusted, respectively, in accordance with thermal loads of the first and second evaporators 15, 18.

Figure 3:
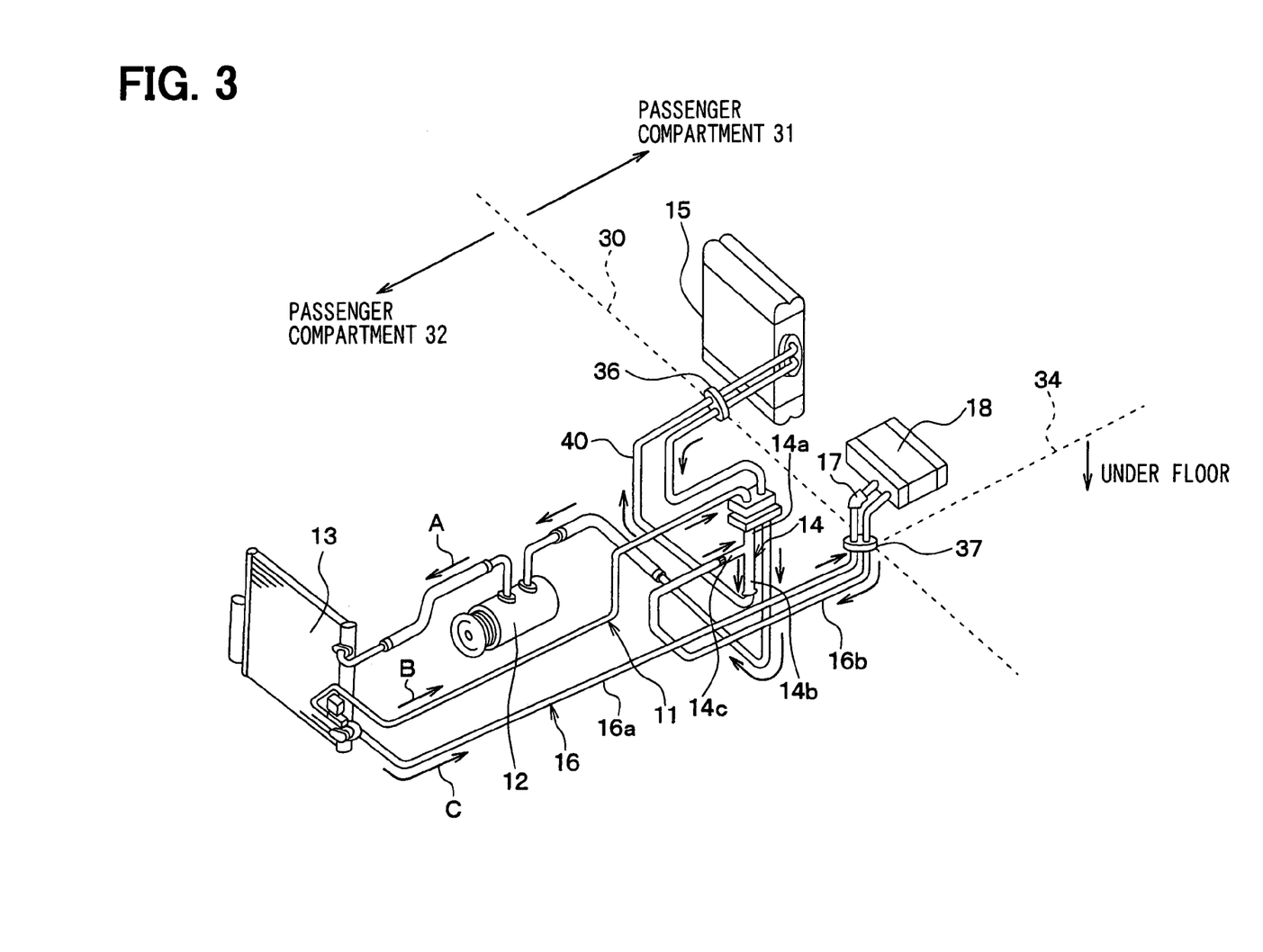
FIG. 3 is a schematic diagram showing a mounting state of a refrigerant cycle device in a vehicle, in a comparison example.

FIG. 3 shows a comparison example of the first embodiment. In the comparison example shown in FIG. 3, because the ejector 14 is arranged in the engine compartment 32, the refrigerant suction pipe 16b becomes longer. Therefore, pressure loss in the refrigerant suction pipe 16b is increased, and the refrigerant evaporation pressure (refrigerant evaporation temperature) of the second evaporator 18 is increased, thereby the cooling capacity of the second evaporator 18 is reduced.

By contrast, in the first embodiment, because the ejector 14 is arranged in the passenger compartment 31 together with both the first and second evaporators 15, 18, the ejector 14 can be arranged relatively close to the second evaporator 18. Therefore, the length of the refrigerant suction pipe 16b can be made sufficiently short as compared with the comparison example of FIG. 3. As a result, the pressure loss of the refrigerant suction pipe 16b can be effectively reduced, and the refrigerant evaporation pressure (refrigerant evaporation temperature) of the second evaporator 18 can be made lower than that in the comparison example. Therefore, the cooling capacity of the second evaporator 18 can be improved.

Further, in the comparison example of FIG. 3, the refrigerant suction pipe 16b is connected to the refrigerant suction port 14c of the ejector 14 through the space under the floor plate 34 and the engine compartment 32. Therefore, the environmental temperature of the refrigerant suction pipe 16b is greatly high as compared with the temperature of the passenger compartment 31. Thus, heat absorbing amount (heat loss) of the refrigerant in the refrigerant suction pipe 16b, heat-absorbed from the environmental area, is increased.

In contrast, according to the first embodiment, an entire range of the refrigerant suction pipe 16 is arranged in the passenger compartment 31 having a relative low temperature, and is covered by the insulating material 33. Therefore, heat absorbing amount of the refrigerant in the refrigerant suction pipe 16b can be effectively restricted. Thus, heat loss of the refrigerant in the refrigerant suction pipe 16b can be effectively restricted.

Furthermore, in the comparison example of FIG. 3, the ejector 14 is arranged in the engine compartment 32. In this case, the number of the refrigerant pipes in the engine compartment is increased, and the pipe connection structure in the engine compartment becomes complex. By contrast, in the first embodiment, only the single high-pressure side refrigerant pipe 16a is added in the refrigerant pipe structure arranged in the engine compartment 32. Therefore, refrigerant pipe connection in the engine compartment can be made simple.

In the first embodiment, the insulating material 33 is attached to the outer surfaces of the refrigerant suction pipe 16b and the ejector 14 both of which are made of metal. Accordingly, even when the refrigerant suction pipe 16b through which low-temperature refrigerant from the outlet of the second evaporator 18 flows is arranged in the passenger compartment, the insulating material 33 prevents air in the passenger compartment from being cooled by directly contacting the refrigerant suction pipe 16b and the ejector 14. Thus, it can prevent dew drops from being caused on the surfaces of the refrigerant suction pipe 16b and the ejector 14.

In the first embodiment, when the refrigerator mounted to the vehicle is not used, electrical power supplied to the electromagnetic valve of the throttle mechanism 17 can be stopped. In this case, the electromagnetic valve of the throttle mechanism 17 is closed, thereby shutting the refrigerant flowing to the second evaporator 18 in the branch passage 16.

In the above-described first embodiment, the throttle mechanism 17 arranged in the branch passage 16 for the refrigerator is constructed with the electromagnetic valve and the fixed throttle. However, the throttle mechanism can be constructed with a single flow adjustment valve which is formed to adjust a refrigerant passage area.

Second Embodiment

Figure 4:
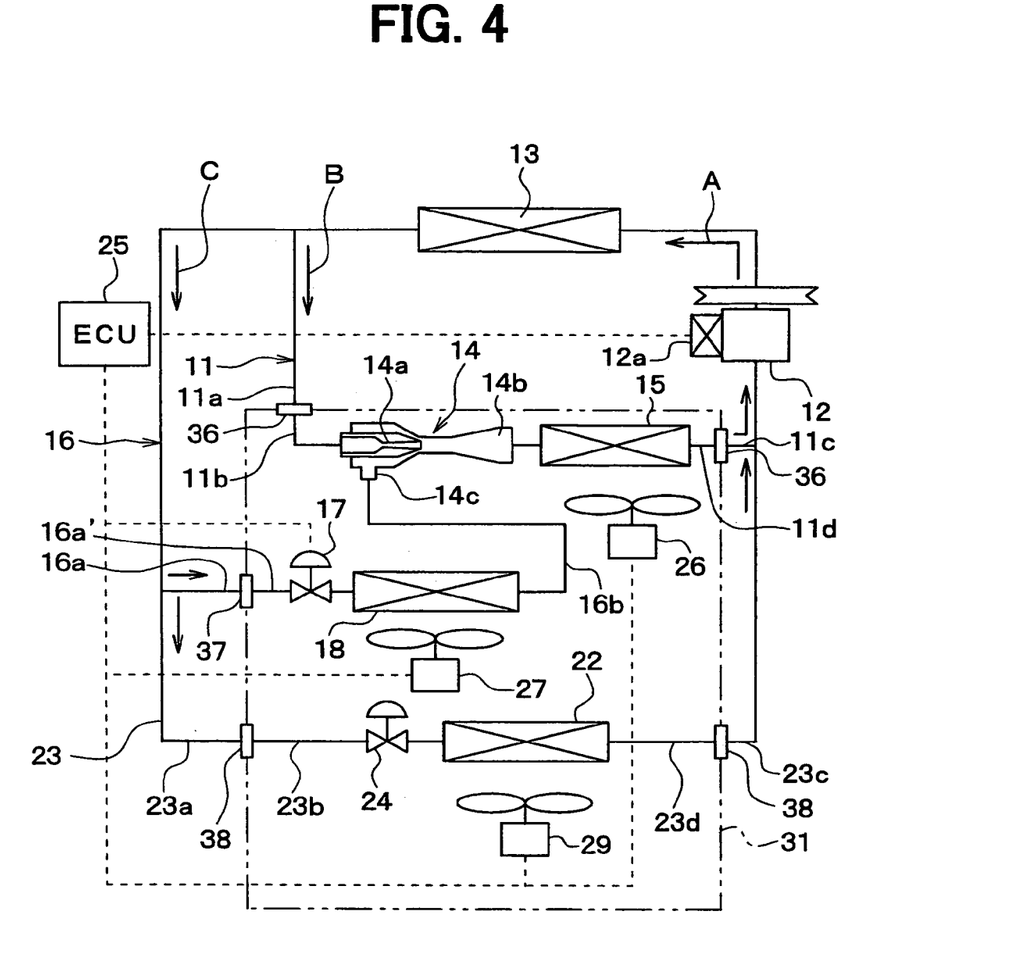
FIG. 4 is a schematic diagram showing a refrigerant cycle device for a vehicle, according to a second embodiment of the present invention.
Figure 5:
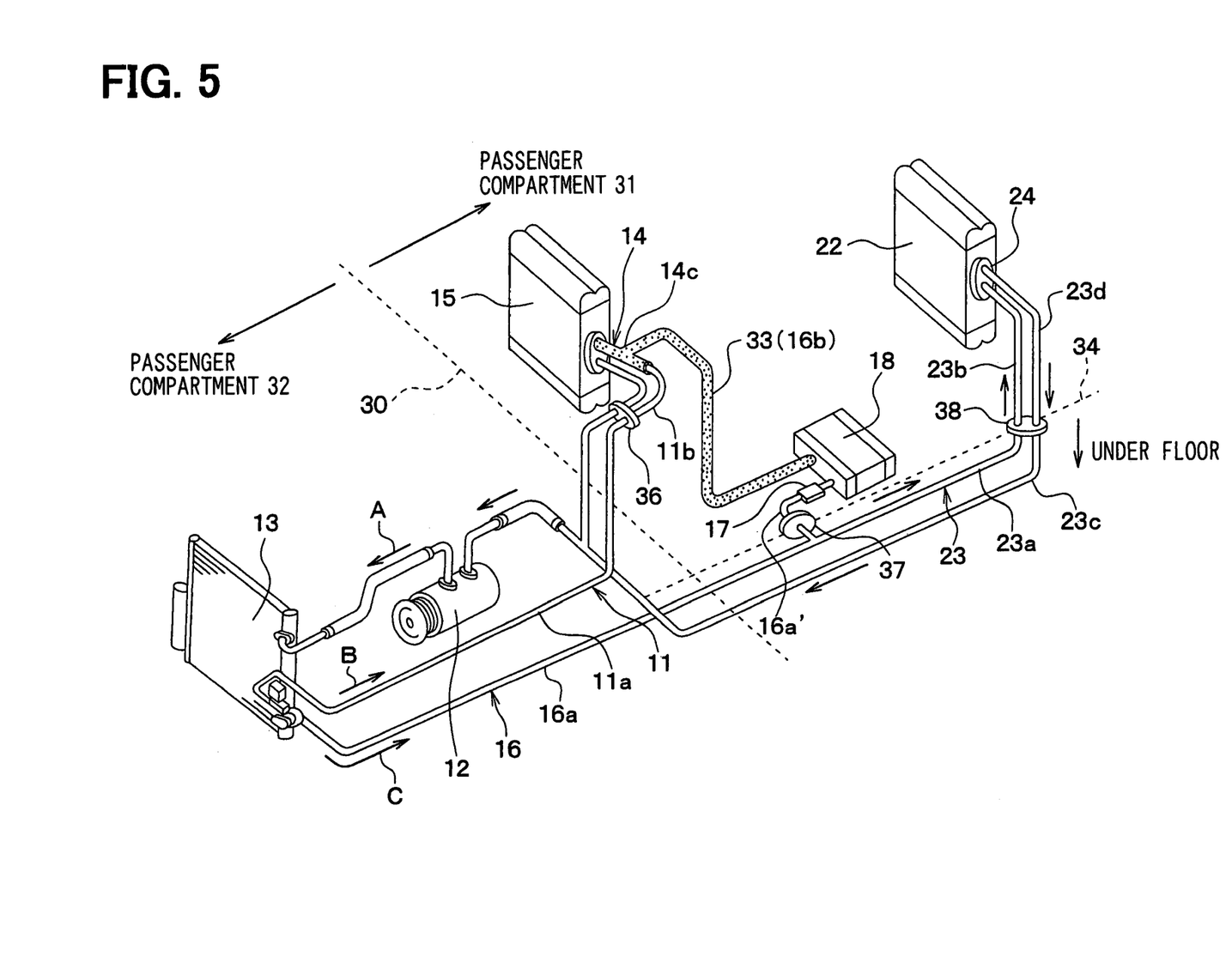
FIG. 5 is a schematic diagram showing a mounting state of the refrigerant cycle device in a vehicle, according to the second embodiment.

The second embodiment will be now described with reference to FIGS. 4 and 5. FIG. 4 is a schematic diagram showing a refrigerant cycle device of the second embodiment, and FIG. 5 is a schematic diagram showing a mounting state of the refrigerant cycle device in the vehicle according to the second embodiment. In the second embodiment, a third evaporator 22 is added in addition to the first and second evaporators 15, 18 of the first embodiment.

In the second embodiment, the branch passage 16 in the above-described first embodiment is used as a first branch passage 16. Furthermore, a second branch passage 23 is provided to be branched from the first branch passage 16 at an upstream side position of the throttle mechanism 17 and to be joined to a refrigerant outlet side of the first evaporator 15. That is, the second branch passage 23 is branched from the first branch passage 16 at a refrigerant upstream side of the throttle mechanism 17 and is joined to the refrigerant circulating path 11 at a refrigerant suction side of the compressor 12. A throttle mechanism 24 is provided in the second branch passage 23, and the third evaporator 22 is provided in the second branch passage 23 at a downstream refrigerant side of the throttle mechanism 24.

The second branch passage 23 is formed by a first high-pressure side refrigerant pipe 23a arranged in the space under the floor plate 34, a second high-pressure side refrigerant pipe 23b arranged in the passenger compartment, a first low-pressure side refrigerant pipe 23c arranged in the space under the floor plate 34, and a low-pressure side refrigerant pipe 23d arranged in the passenger compartment. A pipe connector 38 is arranged in the floor plate 34, so that the first high-pressure side refrigerant pipe 23a is connected to the second high-pressure side refrigerant pipe 23b through the pipe connector 38, and the first low-pressure side refrigerant pipe 23c is connected to the second low-pressure side refrigerant pipe 23d through the pipe connector 38. As shown in FIGS. 4 and 5, the second high-pressure side refrigerant pipe 23b connectable to the pipe connector 38 is connected to a refrigerant inlet portion of the throttle mechanism 24, and the second low-pressure side refrigerant pipe 23d connectable to the pipe connector 38 is connected to a refrigerant outlet portion of the throttle mechanism 24. Furthermore, the first high-pressure side refrigerant pipe 23a connectable to the pipe connector 38 is jointed to the high-pressure side refrigerant pipe 16a, and the first low-pressure side refrigerant pipe 23c connectable to the pipe connector 38 is joined to the refrigerant suction side of the compressor 12.

As the throttle mechanism 24, a thermal expansion valve can be used, as an example. In this case, a throttle open degree of the throttle mechanism 24 can be adjusted so that a super-heating degree of refrigerant at a refrigerant outlet portion of the third evaporator 22 can be maintained at a predetermined value. A third blower (electrical blower) 29 is disposed to blow air toward the third evaporator 22. The refrigerant outlet side of the third evaporator 22 is joined with a downstream side of the first evaporator 15, and the joined pipe portion is connected to the refrigerant suction side of the compressor 12. Accordingly, the refrigerant evaporation pressure of the first and third evaporators 15, 22 is approximately equal to the refrigerant suction pressure of the compressor 12.

In the second embodiment, the first evaporator 15 can be arranged to cool air to be blown toward a front seat area in a passenger compartment, and the third evaporator 22 can be arranged to cool air to be blown toward a rear seat area in the passenger compartment. Therefore, the front seat area and the rear seat area in the passenger compartment can be simultaneously cooled in a similar temperature range. Furthermore, the refrigerator can be cooled in a low temperature range by using the second evaporator 18.

In the second embodiment, the ejector 14 is arranged in the passenger compartment 31, and the outer surfaces of the ejector 14 and the refrigerant suction pipe 16b are covered by the insulating material 33, similarly to the above-described first embodiment. Therefore, the cooling performance of the second evaporator 18 can be improved, and mounting performance of the second evaporator 18 on the vehicle can be effectively improved.

In the second embodiment, when the cooling function of the third evaporator 22 for cooling the rear seat area in the passenger compartment is stopped by the ECU 25, the operation of the third blower 29 is stopped, and the valve of the throttle mechanism 24 is closed to shut a refrigerant flow into the second branch passage 23. However, even in this case, a passage area of the throttle mechanism 24 can be electrically adjusted.

In the second embodiment, the other parts are similar to those of the above-described first embodiment.

Third Embodiment

The third embodiment of the present invention will be now described with reference to FIG. 6.

In the above-described first and second embodiments, the ejector 14 and the first evaporator 15 are connected in series, so that the ejector 14 has a flow adjusting function for adjusting a flow amount of refrigerant flowing into the first evaporator 15, and a pumping function with a refrigerant pressure difference between the first evaporator 15 and the second evaporator 18. In this case, the elector 14 is need to be designed in accordance with the cooling function of the first evaporator 15, thereby it is difficult to operate the refrigerant cycle having the ejector 14 with a high efficiency.

In the third embodiment, the ejector 14 is used to have only pumping function, and a throttle mechanism 39 is provided in the refrigerant circulating path 11 for adjusting the flow amount of refrigerant flowing into the first evaporator 15. In this case, the structure of the ejector 14 can be easily designed.

Figure 6:
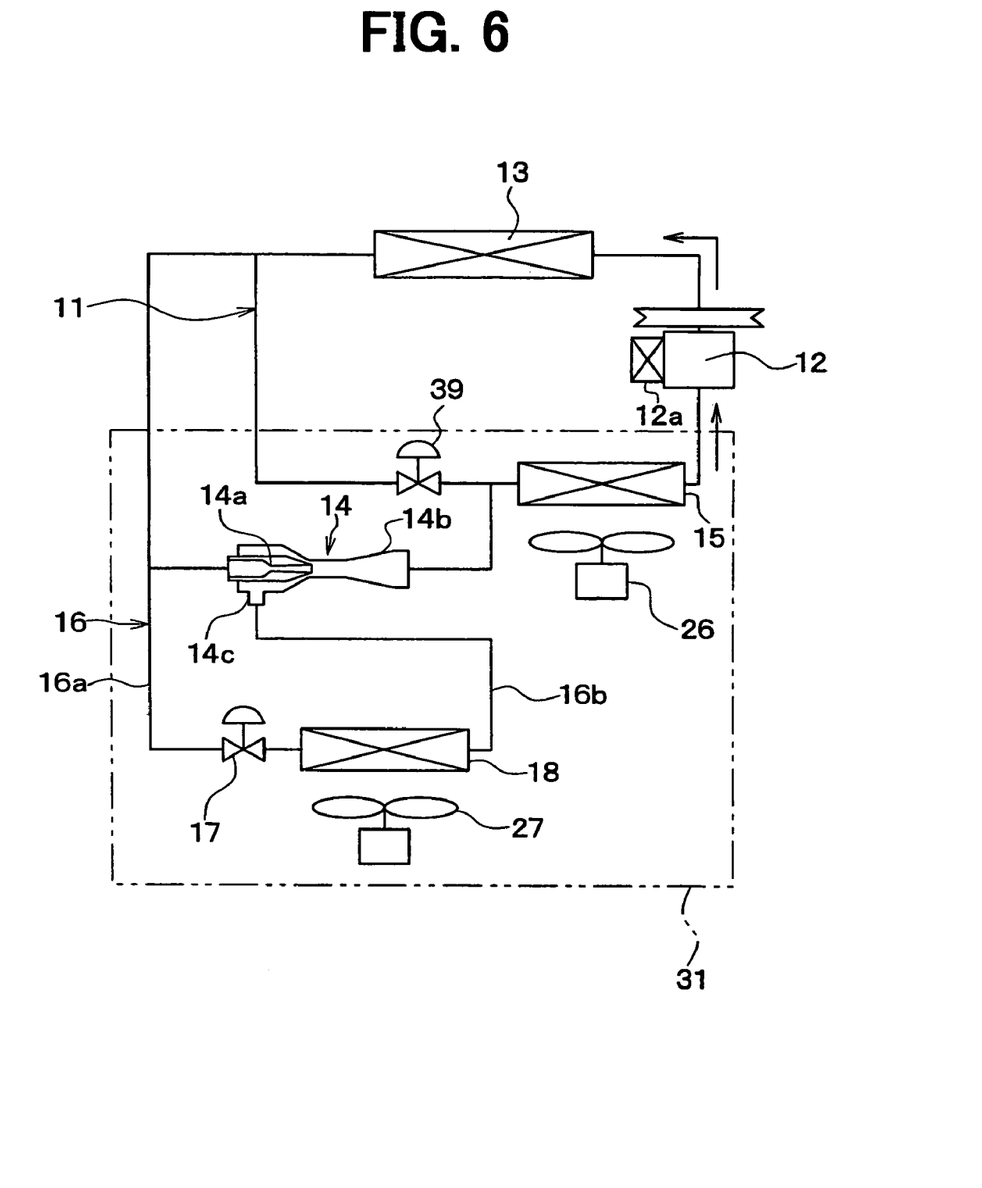
FIG. 6 is a schematic diagram showing a refrigerant cycle device for a vehicle, according to a third embodiment of the present invention.

As shown in FIG. 6, the throttle mechanism 39 is arranged in the refrigerant circulating path 11 between a refrigerant outlet side of the refrigerant radiator 13 and a refrigerant inlet side of the first evaporator 15, and the ejector 14 is arranged in a refrigerant passage in parallel with the throttle mechanism 39.

As the throttle mechanism 39, a thermal expansion valve can be used. In this case, a throttle open degree of the thermal expansion valve is adjusted so that the super-heating degree of refrigerant at the refrigerant outlet of the first evaporator 15 becomes a predetermined value.

Further, the throttle mechanism 17 and the second evaporator 18 are arranged in series in a branch passage 16 branched from a position between the refrigerant outlet portion of the refrigerant radiator 13 and the refrigerant inlet portion of the ejector 14. The refrigerant outlet side of the second evaporator 18 is connected to the refrigerant suction port 14c of the ejector 14. Furthermore, the refrigerant outlet side of the diffuser portion 14b of the ejector 14 is connected to the refrigerant circulating path 11 at a position between the refrigerant outlet portion of the throttle mechanism 39 and the refrigerant inlet portion of the first evaporator 15.

As the throttle mechanism 17 of the first branch passage 16, various type throttle devices can be used. For example, a combination device in which an electromagnetic valve and a fixed throttle such as a capillary tube are combined can be used as the throttle mechanism 17.

As shown in FIG. 6, the ejector 14, the refrigerant suction pipe 16b, the throttle mechanisms 17, 39, the first and second evaporators 15, 18 and the blowers 26, 27 are arranged in the passenger compartment 31. Furthermore, similarly to the above-described first and second embodiments, the outer surfaces of the refrigerant suction pipe 16b and the ejector 14 are covered by the insulating material 33 (not shown in FIG. 6).

Next, operation of the third embodiment will be now described. When the compressor 12 is operated, the refrigerant discharged from the compressor 12 is cooled and condensed in the refrigerant radiator 13. The refrigerant cooled in the refrigerant radiator 13 can be branched into first, second and third refrigerant streams. That is, the first refrigerant stream from the refrigerant radiator 13 is decompressed in the throttle mechanism 39, and flows into the first evaporator 15. The second refrigerant stream from the refrigerant radiator 13 is decompressed in the nozzle portion 14a of the ejector 14 and is pressurized in the diffuser 14b, and flows into the first evaporator 15. Furthermore, the third refrigerant stream from the refrigerant radiator 13 is decompressed in the throttle mechanism 17, and is sucked into the refrigerant suction port 14c of the ejector 14 after passing through the second evaporator 18.

In the third embodiment, the ejector 14 has the pumping function, in which the refrigerant at the refrigerant outlet side of the second evaporator 18 is drawn and is mixed with the refrigerant passing through the nozzle portion 14a, and the mixed refrigerant is pressurized in the diffuser portion 14b. Therefore, the refrigerant evaporation pressure of the first evaporator 15 is higher than the refrigerant evaporation pressure of the second evaporator 18, and a pressure difference is caused between both the first and second evaporators 15 and 18.

Furthermore, in the third embodiment, the flow amount of refrigerant flowing into the first evaporator 15 can be adjusted by the throttle mechanism 39. Therefore, the structure of the ejector 14 can be easily set to have a pump function with a suitable pressure difference between the first and second evaporators 15, 18. Accordingly, the ejector 14 can be set to have a high efficiency in the refrigerant cycle, relative to cycle operation conditions, for example, a compressor rotation speed, an outside air temperature, a space temperature to be cooled, etc.

In addition, because the ejector 14 is arranged in the refrigerant cycle to only have a pump function, a fixed nozzle can be easily used as the nozzle portion 14a of the ejector 14, thereby reducing the product cost.

In the third embodiment, the ejector 14 is arranged in the passenger compartment 31, and the insulating material 33 is attached to the surfaces of the ejector 14 and the refrigerant suction pipe 16b. Therefore, cooling performance of the second evaporator 18 can be effectively improved, and mounting performance of the second evaporator 18 to the vehicle can be effectively improved.

In the third embodiment, the valve operation of the throttle mechanisms 17, 39 may be electrically controlled.

In the third embodiment, the refrigerant outlet side of the diffuser portion 14b of the ejector 14 is connected at a portion between the refrigerant outlet side of the throttle mechanism 39 and the refrigerant inlet side of the first evaporator 15. However, the refrigerant outlet side of the diffuser portion 14b of the ejector 14 can be connected to the refrigerant circulating path 11 at a refrigerant outlet side of the diffuser portion 14b.

Further, in the refrigerant cycle device shown in FIG. 6, the second branch passage 23, the throttle mechanism 24 and the third evaporator 22 described in the second embodiment of FIGS. 4 and 5 can be also provided. In this case, the refrigerant outlet side of the diffuser portion 14b of the ejector 14 may be connected to the refrigerant inlet side of the first evaporator 15, or may be connected to the refrigerant inlet side of the third evaporator 22.

Other Embodiments

Although the present invention has been described in connection with some preferred embodiments thereof with reference to the accompanying drawings, it is to be noted that various changes and modifications will become apparent to those skilled in the art.

For example, in the above-described embodiments, the second evaporator 18 is used for the cooling operation of a refrigerator mounted on a vehicle. However, the first and second evaporators 15 and 18 can be used for performing air conditioning operation for different areas in the passenger compartment of the vehicle. For example, the first evaporator 15 and the second evaporator 18 can be used for performing air conditioning in the front seat area and the rear seat area within the passenger compartment.

Alternatively, both the first evaporator 15 and the second evaporator 18 can be used for performing the cooling operation of a refrigerator. In this case, the first evaporator 15, in which the refrigerant evaporation temperature is relatively high, can be used for a cooling chamber of the refrigerator, and the second evaporator 18, in which the refrigerant evaporation temperature is relatively low, can be used for a freezing chamber of the refrigerator.

In the above-described embodiments, any refrigerant generally used in a vapor-compression refrigerant cycle device can be used. For example, a Freon group refrigerant, an organic compound refrigerant, HC group refrigerant and carbon dioxide can be used as the refrigerant. Furthermore, the vapor-compression refrigerant cycle device can be used as a super-critical refrigerant cycle device having a pressure of a high-pressure side refrigerant higher than the critical pressure of the refrigerant or can be used as a refrigerant cycle device having a pressure of a high-pressure side refrigerant lower than the critical pressure of the refrigerant. Here, the organic compound refrigerant is a normally used refrigerant composed of carbon, fluorine, chlorine and hydrogen. The Freon group refrigerant is for example, hydro chloro fluoro carbon (HCFC) group refrigerant or hydro fluoro carbon (HFC) group refrigerant. Furthermore, as the carbon hydride (HC) group refrigerant, isobutene (R600a), propane (R290), etc. can be used.

Furthermore, a gas-liquid separator can be provided at a downstream refrigerant side of the refrigerant radiator. In this case, only liquid refrigerant separated in the gas-liquid separator can be introduced to the downstream side of the refrigerant radiator 13.

In the above-described embodiments, a variable displacement compressor can be used as the compressor 12. In this case, the displacement of the compressor 12 is controlled by the control device 25, so that the refrigerant amount discharged from the compressor 12 can be controlled. Alternatively, a fixed displacement compressor can be used as the compressor 12. In this case, the compression operation of the compressor 12 is controlled by using the clutch 12a, and a discharge amount of the refrigerant from the compressor 12 is controlled by controlling the on/off operation of the compressor 12. Further, the rotational speed of the compressor 12 can be electrically controlled.

In the above-described embodiments, as the nozzle portion 14a, a variable nozzle can be used. In this case, a refrigerant flow area (e.g., throttle open degree) of the nozzle portion 14a can be changed.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A refrigerant cycle device for a vehicle, comprising:
a compressor which compresses refrigerant;
a refrigerant radiator for cooling high-pressure refrigerant discharged from the compressor;
an ejector which includes a nozzle for decompressing and expanding refrigerant from the refrigerant radiator, a refrigerant suction port from which refrigerant is drawn by a refrigerant steam jetted from the nozzle, and a pressure-increasing portion in which the refrigerant jetted from the nozzle and the refrigerant drawn from the refrigerant suction port are mixed and pressure of the refrigerant is increased by converting speed energy to pressure energy;
a first evaporator for evaporating refrigerant flowing out of the pressure-increasing portion of the ejector, the first evaporator being located at a downstream side of the ejector and having a refrigerant outlet coupled to a refrigerant suction side of the compressor;
a first branch passage through which a refrigerant downstream side of the refrigerant radiator is connected to a refrigerant suction port of the ejector;
a first throttle member, located in the first branch passage, for decompressing refrigerant from the refrigerant radiator;
a second evaporator for evaporating refrigerant to be drawn into the refrigerant suction port, the second evaporator being located in the first branch passage at a refrigerant downstream side of the first throttle member, wherein the ejector, the first evaporator and the second evaporator are arranged in a passenger compartment of the vehicle;
a refrigerant suction pipe between a refrigerant outlet of the second evaporator and the refrigerant suction port of the ejector, the refrigerant suction pipe being provided to define a part of the first branch passage; and
an insulating member provided on a surface of the refrigerant suction pipe, wherein the refrigerant suction pipe is arranged in the passenger compartment.

2. The refrigerant cycle device according to claim 1, wherein the insulating member is provided to cover all surfaces of the refrigerant suction pipe and the ejector.

3. The refrigerant cycle device according to claim 1, wherein the compressor and the refrigerant radiator are arranged in an engine compartment of the vehicle.

4. The refrigerant cycle device according to claim 1, wherein:
the first evaporator is disposed to cool air to be blown into the passenger compartment; and
the second evaporator is disposed to cool a refrigerator arranged in the passenger compartment.

5. The refrigerant cycle device according to claim 1, wherein the second evaporator has a refrigerant evaporation pressure that is lower than a refrigerant evaporation pressure of the first evaporator.

6. The refrigerant cycle device according to claim 1, further comprising:
a second branch passage branched from a refrigerant downstream side of the refrigerant radiator and connected to a refrigerant outlet side of the first evaporator;
a second throttle member, disposed in the second branch passage, for decompressing refrigerant; and
a third evaporator disposed in the second branch passage at a refrigerant downstream side of the second throttle member.

7. The refrigerant cycle device according to claim 6, wherein:
the first evaporator has a refrigerant evaporation pressure that is approximately equal to a refrigerant evaporation pressure of the third evaporator;
the first evaporator is arranged to cool air to be blown toward a front area in the passenger compartment; and
the third evaporator is arranged to cool air to be blown toward a rear area in the passenger compartment.

8. A refrigerant cycle device for a vehicle, comprising:
a compressor which compresses refrigerant;
a refrigerant radiator for cooling high-pressure refrigerant discharged from the compressor;
a first throttle member which decompresses refrigerant at a downstream side of the refrigerant radiator;
a first evaporator for evaporating refrigerant flowing out of the first throttle member, the first evaporator having a refrigerant outlet coupled to a refrigerant suction side of the compressor;
an ejector which includes a nozzle for decompressing and expanding refrigerant from the refrigerant radiator, a refrigerant suction port from which refrigerant is drawn by a refrigerant steam jetted from the nozzle, and a pressure-increasing portion in which the refrigerant jetted from the nozzle and the refrigerant drawn from the refrigerant suction port are mixed and pressure of the refrigerant is increased by converting speed energy to pressure energy;
a first branch passage through which a refrigerant downstream side of the refrigerant radiator is connected to a refrigerant suction port of the ejector;
a second throttle member, located in the first branch passage, for decompressing refrigerant from the refrigerant radiator;
a second evaporator for evaporating refrigerant to be drawn into the refrigerant suction port, the second evaporator being located in the first branch passage at a downstream refrigerant side of the second throttle member, wherein the ejector, the first evaporator and the second evaporator are arranged in a passenger compartment of the vehicle;
a refrigerant suction pipe between a refrigerant outlet of the second evaporator and the refrigerant suction port of the ejector, the refrigerant suction pipe being provided to define a part of the first branch passage; and
an insulating member provided on a surface of the refrigerant suction pipe,
wherein the refrigerant suction pipe is arranged in the passenger compartment.

9. The refrigerant cycle device according to claim 8, wherein the pressure increasing portion of the ejector has a refrigerant outlet coupled to a refrigerant inlet side of the first evaporator.

10. The refrigerant cycle device according to claim 8, wherein the insulating member is provided to cover all surfaces of the refrigerant suction pipe and the ejector.

11. The refrigerant cycle device according to claim 8, wherein the compressor and the refrigerant radiator are arranged in an engine compartment of the vehicle.

12. The refrigerant cycle device according to claim 8, wherein:
the first evaporator is disposed to cool air to be blown into the passenger compartment; and
the second evaporator is disposed to cool a refrigerator arranged in the passenger compartment.

13. The refrigerant cycle device according to claim 8, wherein the second evaporator has a refrigerant evaporation pressure that is lower than a refrigerant evaporation pressure of the first evaporator.

14. The refrigerant cycle device according to claim 8, further comprising:
a second branch passage branched from a refrigerant downstream side of the refrigerant radiator and connected to a refrigerant outlet side of the first evaporator;
a third throttle member, disposed in the second branch passage, for decompressing refrigerant; and
a third evaporator disposed in the second branch passage at a downstream side of the third throttle member.

15. The refrigerant cycle device according to claim 14, wherein:
the first evaporator has a refrigerant evaporation pressure that is approximately equal to a refrigerant evaporation pressure of the third evaporator;
the first evaporator is arranged to cool air to be blown toward a front area in the passenger compartment; and
the third evaporator is arranged to cool air to be blown toward a rear area in the passenger compartment.

16. A refrigerant cycle device in a vehicle, comprising:
a compressor which compresses refrigerant, the compressor being arranged outside a passenger compartment;
a refrigerant radiator, arranged outside the passenger compartment, for cooling high-pressure refrigerant discharged from the compressor;
an ejector which includes a nozzle for decompressing and expanding refrigerant from the refrigerant radiator, and a refrigerant suction port from which refrigerant is drawn by a refrigerant steam jetted from the nozzle;
a first evaporator located at a downstream side of the ejector and having a refrigerant outlet coupled to a refrigerant suction side of the compressor;
a second evaporator for evaporating refrigerant from the refrigerant radiator, the second evaporator having a refrigerant outlet; and
a refrigerant suction pipe between the refrigerant outlet of the second evaporator and the refrigerant suction port of the ejector, wherein the ejector, the first evaporator, the second evaporator and the refrigerant suction pipe are arranged in the passenger compartment.

17. The refrigerant cycle device according to claim 16, further comprising:

an insulating member at least covers a part of components arranged in the passenger compartment including the refrigerant suction pipe.

18. The refrigerant cycle device according to claim 16, wherein the first evaporator and the second evaporator are separately located in the passenger compartment, the refrigerant cycle device further comprising:

a first communicating device, provided close to the first evaporator, through which a high-pressure refrigerant passage for the first evaporator is led into the passenger compartment; and a second communicating device, provided close to the second evaporator, through which a high-pressure refrigerant passage for the second evaporator is led into the passenger compartment.

19. The refrigerant cycle device according to claim 16, wherein:

the first evaporator is disposed to cool air to be blown into the passenger compartment; and the second evaporator is disposed to cool a refrigerator arranged in the passenger compartment.

20. The refrigerant cycle device according to claim 16, wherein the second evaporator has a refrigerant evaporation pressure that is lower than a refrigerant evaporation pressure of the first evaporator.

* * * * *